United States Patent [19]
Wiesenfeld et al.

[11] Patent Number: 5,366,650
[45] Date of Patent: Nov. 22, 1994

[54] ICE-MELTING COMPOSITION HAVING ANTI-CORROSION PROPERTIES

[75] Inventors: Arnold Wiesenfeld, Mahwah; James K. Barbour, Red Bank, both of N.J.

[73] Assignee: Castlebar Industries Corp., Woodbridge, N.J.

[21] Appl. No.: 105,955

[22] Filed: Aug. 13, 1993

[51] Int. Cl.$^5$ ................................................. C09K 3/18
[52] U.S. Cl. ......................................... 252/70; 106/13
[58] Field of Search ............................. 106/13; 252/70

[56] References Cited

U.S. PATENT DOCUMENTS

| | | | |
|---|---|---|---|
| 2,980,620 | 4/1961 | Hatch | 106/13 |
| 5,211,868 | 5/1993 | Ireland et al. | 252/70 |

FOREIGN PATENT DOCUMENTS

| | | | |
|---|---|---|---|
| 386886 | 9/1990 | European Pat. Off. | 252/70 |
| 0156918 | 9/1982 | Germany | 252/70 |
| 60-195178 | 10/1985 | Japan | 252/70 |

*Primary Examiner*—Anthony Green
*Attorney, Agent, or Firm*—Ezra Sutton

[57] ABSTRACT

The present invention relates to ice melters having a ph of less than 7 to make them acidic and having an anti-corrosion compound dispersed therein, such as 2 Butyne-1,4 diol, so that the ice melter is environmentally safe and greatly reduces the corrosion of steel bridges, guard rails on roads, and the like.

18 Claims, No Drawings

ICE-MELTING COMPOSITION HAVING ANTI-CORROSION PROPERTIES

FIELD OF THE INVENTION

The present invention relates to ice melters having a ph of less than 7 to make them acidic and having an anti-corrosion compound dispersed therein, such as 2 Butyne-1,4 diol, so that the ice melter is environmentally safe and greatly reduces the corrosion of steel bridges, guard rails on roads, and the like.

BACKGROUND OF THE INVENTION

Ice melters have been known and used for many years on roads, bridges, driveways, walkways, and the like. However, presently-used ice melters commonly cause corrosion damage to steel bridges, guard rails on roads, metal fences and gates, and the like. Although there have been attempts to reduce the corrosive effect of ice melters, they have not been sufficiently effective, and they are not always safe to the environment. For example, in one case, phosphates have been added to ice melters to reduce their corrosive effects, but phosphates have been barred by local ordinances in some areas because they are not environmentally safe.

Accordingly, it is an object of the present invention to provide an improved ice melter which has anti-corrosion properties and which is environmentally safe.

SUMMARY OF THE INVENTION

In the present invention, there is provided an ice-melting composition having anti-corrosion properties, which includes an ice-melting chemical selected from the group consisting of a chloride salt, urea, ammonium sulfate, calcium magnesium acetate, and combinations thereof, with the ice-melting chemicals being at least 95% by weight of the ice-melting composition. The ice-melting chemicals have a ph value of less than 7 so as to be acidic.

An anti-corrosion compound is dispersed in the ice-melting composition in the range of up to 5% by weight of the ice-melting composition, and in the preferred embodiment, the anti-corrosion compound is 2 Butyne-1,4 diol and is 0.50% by weight of the ice-melting composition.

Further objects, features, and advantages of the present invention will become apparent upon consideration of the detailed description of the presently-preferred embodiment.

DESCRIPTION OF PREFERRED EMBODIMENTS OF THE INVENTION

The present invention will work with most commonly-used ice melters or ice-melting chemicals, such as chloride salts, which include sodium chloride, potassium chloride, calcium chloride, and magnesium chloride. Examples of other ice-melting compounds include urea, ammonium sulfate, and calcium magnesium acetate.

In accordance with the present invention, any one of these ice melters, or any combination thereof, is combined with an anti-corrosion compound used to control base metal attacks in acid pickling baths. The ice-melting composition of the present invention can be a physical mixture of the ice-melters and the anti-corrosion compound, or it can be a mixture of the crystallized solids obtained by evaporating a solution of the components. The anti-corrosion compound may be any of those used to protect base metals from attack in sulfuric acid or hydrochloric acid pickling baths. The preferred anti-corrosion compound is 2 Butyne-1,4 diol.

In addition, other anti-corrosion compounds may be used, such as:

A. Thiourea and its derivatives. Examples of these compounds are:
  1. Diethyl thiourea
  2. Allyl thiourea
  3. 1-(3 amino-4-phenylazopyrazol-5-yl)-3-benzyl thiourea
  4. Quinoline
  5. Acriflavine B. Aromatic and alkyl amine and their derivatives. Examples of these compounds are:
  1. Alkyl aryl amines
  2. Alkynoxymethyl amines
  3. Oximines
  4. Nitriles
  5. Nitropyridine
  6. Lutidine
  7. Collidine
  8. Mono n-butyl amine
  9. Dibutyl amine
  10. Tributyl amine
  11. Phenylene diamine and derivatives (ortho, meta and para)
  12. Cyclo hexyl amine
  13. Diphenyl amine C. Quaternaries and their derivatives. Examples of these compounds are:
  1. 1,1'-alkylene bispyridinium compounds with quaternary substitution on the ring
  2. Hexamethylenetetramine hydro iodide D. Fatty acid ethoxylates and their derivatives. Examples of these compounds are:
  1. Tall oil fatty acid ethoxylates
  2. Soya bean fatty acid ethoxylates
  3. Cotton seed oil fatty acid ethoxylates
  4. Linseed oil fatty acid ethoxylates E. Sulfur-containing compounds. Examples of these compounds are:
  1. Sulfoxides
  2. Alkyl sulfides
  3. Dibutyl sulfide
  4. Thiosemicarbazide
  5. 1-phenyl thiosemicarbazide
  6. Metacaptans
  7. Thioethers
  8. Sulfonium
  9. Thiocyanates
  10. 2-Mercaptobenothiazole F. Acelylenic alcohol compounds. An example of such a compound is:
  1. 2 Butyne - 1,4 diol G. Heteraromatic compounds. An example of such a compound is:
  1. Benzotriazole H. Miscellaneous compounds. Examples of these compounds are:
  1. Formaldlyhyde
  2. Furfuraldehyde
  3. Biguanide
  4. Guanylurea
  5. Biuret
  6. Coal tar extracts
  7. para Toluene sulfonic acid 8. beta Naphthalene sulfonic acid
9. Katapins
10. Rodine (trade name) 204 [76162-22-8]
11. Chimec 315S [88385-18-6]
12. Tenzinat PA-221 [88403-32-1]

The anti-corrosion compound is dispersed throughout the ice-melting crystals or chemicals, so they are released simultaneously with the dissolving of the ice-melting crystals. The anti-corrosion compound may be up to 5% by weight of the ice-melting composition of the present invention, but the preferred range is 0.20% to 1% by weight, and the preferred embodiment is 0.50% by weight. Another preferred range is 0.45% to 0.55% by weight.

The ice-melting chemicals normally used for melting ice, such as chloride salts, are typically basic and have a ph value above 7. Such ice-melting chemicals will not perform as desired in accordance with the present invention, and it has been found that the ice-melting composition of the present invention should have a ph value of less than 7, so as to be slightly acidic. Preferably, the ph value should be in the range of between 5.0 and 6.0. This can be accomplished by adding 0.2% by weight of a weak organic acid to the ice-melting composition, to adjust the ph value to the desired range. Alternatively, the ice-melting salts can have their ph value adjusted to less than 7.

Laboratory tests have been conducted and support the results of the present invention. In laboratory tests, mild steel coupons were submerged in 5% aqueous solutions of 1) salt; 2) calcium chloride; 3) salt, magnesium chloride, urea, calcium chloride, and 2 Butyne-1,4 diol; and 4) water for 10 minutes. The 4 coupons were removed and air dried. The coupons from the solutions without the anti-corrosion compound (Nos. 1, 2, and 4) showed a rusty appearance. The coupon removed from solution No. 3 (with the protective chemical) was clear and colorless. The dried coupons showed a substantial covering of rust, except for the one soaked in solution No. 3, which had only a fraction of the amount of rust, part of which was of a darker, firmer texture and continued to add to the coupon more readily, resulting in less metal loss.

In accordance with the present invention, there is provided an improved ice melter, which has anti-corrosion properties and which is environmentally safe.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. An ice-melting composition having anti-corrosion properties, comprising:
   a) an ice-melting chemical selected from the group consisting of a chloride salt, urea, ammonium sulfate, calcium magnesium acetate, and combinations thereof, said ice-melting chemicals being at least 95% by weight of said ice-melting composition;
   b) said ice-melting chemicals having a ph value of less than 7 so as to be acidic; and
   c) an anti-corrosion compound being 2-butyne-1,4 diol in said ice-melting composition in the range of 0.20% to 5% by weight of said ice-melting composition.

2. An ice-melting composition in accordance with claim 1, wherein said chloride salt is sodium chloride, potassium chloride, calcium chloride, or magnesium chloride.

3. An ice-melting composition in accordance with claim 1, wherein said ice-melting chemicals have a ph in the range of between 5.0 and 6.0.

4. An ice-melting composition in accordance with claim 1, wherein said 2 Butyne-1,4 diol is dispersed in said ice-melting composition in the range of 0.20% to 1% by weight.

5. An ice-melting composition in accordance with claim 1, wherein said 2 Butyne-1,4 diol is dispersed in said ice-melting composition in the range of 0.45% to 0.55% by weight.

6. An ice-melting composition having anti-corrosion properties, comprising:
   a) an ice-melting chemical selected from the group consisting of a chloride salt, urea, ammonium sulfate, calcium magnesium acetate, and combinations thereof, said ice-melting chemicals being at least 95% by weight of said ice-melting composition;
   b) said ice-melting chemicals having a ph value of less than 7 so as to be acidic; and
   c) an anti-corrosion compound dispersed in said ice-melting composition in the range of 0.20% to 5% by weight of said ice-melting composition selected from the group consisting of an acelylenic alcohol derivative, alkyl amine, oximine, aryl amine, a thiourea derivative, and an alkyl amine derivative.

7. An ice-melting composition in accordance with claim 6, wherein said chloride salt is sodium chloride, potassium chloride, calcium chloride, or magnesium chloride.

8. An ice-melting composition in accordance with claim 6, wherein said ice-melting chemicals have a pH in the range of between 5.0 and 6.0.

9. An ice-melting composition in accordance with claim 6, wherein said acelylenic alcohol derivative is dispersed in said ice-melting composition in the range of 0.20% to 1% by weight.

10. An ice-melting composition in accordance with claim 6, wherein said acelylenic alcohol derivative is dispersed in said ice-melting composition in the range of 0.45% to 0.55% by weight.

11. An ice-melting composition in accordance with claim 6, wherein said alkyl amine is dispersed in said ice-melting composition in the range of 0.20% to 1% by weight.

12. An ice-melting composition in accordance with claim 6, wherein said alkyl amine is dispersed in said ice-melting composition in the range of 0.45% to 0.55% by weight.

13. An ice-melting composition in accordance with claim 6, wherein said oximine is dispersed in said ice-melting composition in the range of 0.20% to 1% by weight.

14. An ice-melting composition in accordance with claim 6, wherein said oximine is dispersed in said ice-melting composition in the range of 0.45% to 0.55% by weight.

15. An ice-melting composition in accordance with claim 6, wherein said aryl amine is dispersed in said ice-melting composition in the range of 0.20% to 1% by weight.

16. An ice-melting composition in accordance with claim 6, wherein said aryl amine is dispersed in said ice-melting composition in the range of 0.45% to 0.55% by weight.

17. An ice-melting composition in accordance with claim 6, wherein said thiourea derivative is dispersed in said ice-melting composition in the range of 0.20% to 1% by weight.

18. An ice-melting composition in accordance with claim 6, wherein said thiourea derivative is dispersed in said ice-melting composition in the range of 0.45% to 0.55% by weight.

* * * * *